United States Patent
Belisle et al.

(10) Patent No.: US 8,332,605 B2
(45) Date of Patent: Dec. 11, 2012

(54) REORGANIZATION OF A FRAGMENTED DIRECTORY OF A STORAGE DATA STRUCTURE COMPRISED OF THE FRAGMENTED DIRECTORY AND MEMBERS

(75) Inventors: Jon Christopher Belisle, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 12/868,568

(22) Filed: Aug. 25, 2010

(65) Prior Publication Data

US 2012/0054459 A1 Mar. 1, 2012

(51) Int. Cl.
*G06F 12/02* (2006.01)

(52) U.S. Cl. .................. 711/165; 711/E12.002; 707/828
(58) Field of Classification Search .................. None
See application file for complete search history.

(56) References Cited

U.S. PATENT DOCUMENTS

| | | | |
|---|---|---|---|
| 5,623,669 A * | 4/1997 | Kincaid | 1/1 |
| 5,887,274 A | 3/1999 | Barry et al. | |
| 6,496,913 B1 | 12/2002 | Taugher et al. | |
| 2005/0228963 A1 * | 10/2005 | Rothman et al. | 711/170 |
| 2009/0049110 A1 | 2/2009 | Plow et al. | |
| 2009/0271427 A1 | 10/2009 | Costaglio | |
| 2012/0047189 A1 * | 2/2012 | Staffer et al. | 707/830 |

OTHER PUBLICATIONS

Synetech. "Wiping Deleted Directory Entries and Defragmenting Directories." Nov. 2009. http://superuser.com/questions/74882/wiping-deleted-directory-entries-and-defragmenting-directories.*
Seungwoo Ryu et al. "Flash-Aware Cluster Allocation Method Based on Filename Extension for FAT File System." Mar. 2010. ACM. SAC'10.*
M. Lovelace et al., "Partitioned Data Set Extended Usage Guide", IBM Corporation, Document No. SG24-6106-01, May 2005.

* cited by examiner

*Primary Examiner* — Charles Rones
*Assistant Examiner* — Nathan N Sadler
(74) *Attorney, Agent, or Firm* — Rabindranath Dutta; Konrad Raynes & Victor LLP (57) ABSTRACT

A directory and members are allocated to store a data set, wherein the directory stores pointers to the members to allow data stored in the members to be accessed. The directory is expanded to accommodate an expansion of the data set, causing the directory to be stored in non-contiguous pages and becoming fragmented. A computational device determines that a threshold that measures a level of fragmentation of the directory relative to an amount of storage allocated for the data set has been exceeded. The computational device reorganizes the fragmented directory, into a reorganized directory that is stored in contiguous pages at the end of the data set, in response to determining that the threshold has been exceeded.

20 Claims, 7 Drawing Sheets

REORGANIZATION OF A FRAGMENTED DIRECTORY OF A STORAGE DATA STRUCTURE COMPRISED OF THE FRAGMENTED DIRECTORY AND MEMBERS

BACKGROUND

1. Field

The disclosure relates to a method, a system, and a computer program product for the reorganization of a fragmented directory of a storage data structure comprised of the fragmented directory and members.

2. Background

When a data set is allocated, a certain amount of space is reserved in units of blocks, tracks, cylinders, etc., on a storage disk or a storage device. A sequential data set may be comprised of one or more records that are processed in sequence. In the sequential data set the records in the data set are physically arranged one after another.

A partitioned data set (PDS) adds a layer of organization to the structure of the sequential data set. A PDS is comprised of a directory and zero or more members. Each member is like a sequential data set and has a simple name. The directory is a series of keyed blocks, which contain entries for the members in the PDS. Each entry is comprised of a member name and a pointer, and some optional user data. The PDS structure may provide efficient access to libraries of related members, such as load modules, program source modules, Job Control Language (JCL), etc. Many system data sets are also kept in PDSs, especially when such system data sets are comprised of many small related files.

A partitioned data set extended (PDSE) is comprised of a directory and zero or more members, just like a PDS. While the size of a PDS directory is fixed regardless of the number of members in the PDS data set, the size of a PDSE directory is flexible and expands to fit the members stored in the PDSE data set. In PDSE, the directory may expand automatically as needed, up to an addressing limit.

In PDSE, when the pages at the front of the data set are used up, an extra directory page may be put in the first available slot in the allocated space. If no space is left in the current extents, a new secondary extent may be added. The PDSE directory is an indexed structure, which improves search performance and the time taken to add a member entry. When a PDSE member is updated or replaced, it is written in the first available space. This is either at the end of the data set or in a space in the middle of the data set marked for reuse.

SUMMARY OF THE PREFERRED EMBODIMENTS

Provided are a method, a system, and a computer program product in which a directory and members are allocated to store a data set, wherein the directory stores pointers to the members to allow data stored in the members to be accessed. The directory is expanded to accommodate an expansion of the data set, causing the directory to be stored in non-contiguous pages and becoming fragmented. A computational device determines that a threshold that measures a level of fragmentation of the directory relative to an amount of storage allocated for the data set has been exceeded. The computational device reorganizes the fragmented directory, into a reorganized directory that is stored in contiguous pages at the end of the data set, in response to determining that the threshold has been exceeded.

In additional embodiments, the threshold is a ratio of the number of non-contiguous directory pages to the number of cylinders used to the store the data set.

In yet additional embodiments, the threshold is a ratio of the number of non-contiguous directory pages to the number of tracks used to the store the data set.

In further embodiments, subsequent to determining that the threshold has been exceeded, and prior to reorganizing the fragmented directory, write operations are restricted on the data set while continuing to allow read operations on the data set. Subsequent to storing the reorganized directory at the end of the data set, write operations are allowed on the data set, and pages that previously stored the fragmented directory are indicated as unused space into which new data is to be stored.

In yet further embodiments, the members remain in pages where the members are originally stored, in response to the reorganizing of the fragmented directory, wherein the pointers to the members remain unchanged in the reorganized directory. Attribute directory pages and name directory pages are updated with a location of the reorganized directory to allow the data stored in the members to be accessed via the reorganized directory.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In PDSE data sets, the data for a client may be stored sequentially in members. The PDSE data set can grow into a large number of extents and may contain a large number of members. Each member has data that is unique and is accessed by the name corresponding to the member. The actual data for the member may be stored in one or more physical records on direct access storage devices (DASD). In order to access the members a set of PDSE index information that is stored in a directory is kept. As the PDSE data set grows over time and new members are added, the directory can become fragmented within the PDSE data set. This can lead to increased overhead and reduced performance.

Certain embodiments detect when the directory of a PDSE is becoming fragmented to the point where performance is impacted. An exemplary application then dynamically reorganizes the fragmented PDSE directory and places the PDSE directory at the end of the current PDSE. The original area occupied by the directory is marked as available space and can be used by the data members as a storage area.

Certain embodiments utilize a threshold value via which it is determined that the number of non-contiguous directory records is at a point where it is negatively impacting PDSE access performance. As the number of non-contiguous directory records increases, it requires additional I/O and storage control blocks to move through the directories. An exemplary threshold value may allow 10 non-contiguous index directories per 100 cylinders of member data and directory reorganization is performed when the threshold is exceeded. In other words, a very large data set may be allowed to have more extents than a smaller data set. The rationale is that as data sets grow larger, it may be appropriate for the directory portion to expand. If a fixed extension amount for the directory was used as the threshold, the directory may be reorganized too often and this may lead to excessive reorganizations.

In certain embodiments, once the threshold is exceeded, the directory is reorganized into a single ordered structure and put at the end of the current data set. If no free space is available for the reorganized directory, the data set may be extended by a secondary allocation amount so that space is available for the reorganized directory. During the reorganization, read access is still allowed to the old directory. Any updates are forced to wait through the use of a shared lock. Once the reorganized directory construction is completed, the index pointers corresponding to the reorganized directory are updated to reflect the location of the reorganized directory and the start of the reorganized directory is stored in the root attribute directory (AD) and name directory (ND) pages. At this point the old directory pages are marked as available for data members to use.

Exemplary Embodiments

Figure 1:
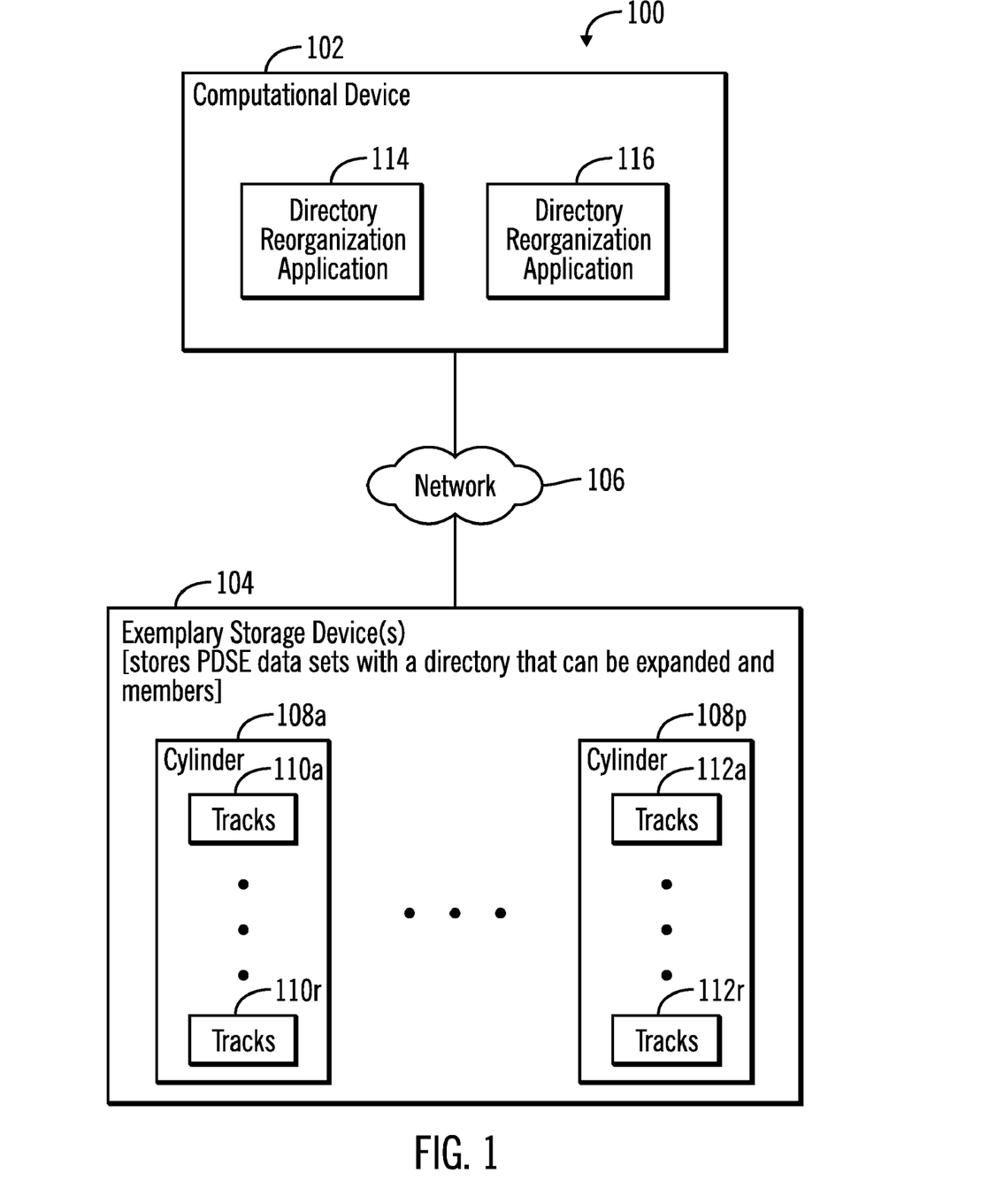
FIG. 1 illustrates a block diagram of a computing environment that includes a computational device coupled to a plurality of storage devices, in accordance with certain embodiments.

FIG. 1 illustrates a block diagram of a computing environment 100 that includes a computational device 102 coupled to a plurality of storage devices 104, in accordance with certain embodiments. The computational device 102 may be any suitable device including those presently known in the art, such as, a personal computer, a workstation, a server, a mainframe, a hand held computer, a palm top computer, a telephony device, a network appliance, a blade computer, a storage server, a storage controller, etc. The storage devices may comprise direct access storage devices (DASD), optical devices, solid state devices, sequential storage devices, etc.

The coupling of the computational device 102 to the plurality of storage devices 104 may be over a network 106, wherein the network 106 may be any network known in the art, such as, the Internet, an intranet, a Local area network (LAN), a Storage area network (SAN), a Wide area network (WAN), a wireless network, etc. The computational device 102 may alternatively be connected to the storage devices 104 without a network, such as through direct lines, common bus systems, etc., in a manner known in the art. Also the network 106 may be part of one or more larger networks or may be an independent network or may be comprised of multiple interconnected networks. In certain embodiments, the computational device 102 and the storage devices 104 of FIG. 1 may be a cloud component part included in a cloud computing environment.

In certain exemplary embodiments, the storage devices 104 may comprise a plurality of direct access storage devices, such as disk drives, comprising a plurality of cylinders 108a . . . 108p, wherein each exemplary cylinder may have a plurality of tracks, such as tracks 110a . . . 110r shown within exemplary cylinder 108a, and tracks 112a . . . 112r shown within exemplary cylinder 108p. In certain embodiments the cylinders 108a . . . 108p store PDSE data sets that are organized into a directory that can be expanded and members, wherein the directory has pointers to allow access to data stored in the members.

Implemented within the computational device 102 is a directory reorganization application 114 that uses information stored in a directory reorganization threshold data structure 116 to determine when to reorganize a directory of the PDSE data set stored in the storage devices 104, wherein the directory has become fragmented as a result of an expansion of the PDSE data set. The directory reorganization application 114 reorganizes the fragmented directory of the PDSE data set stored in the storage devices 104, into a reorganized directory that is stored in contiguous pages at the end of the PDSE data set stored in the storage devices 104.

Figure 2:
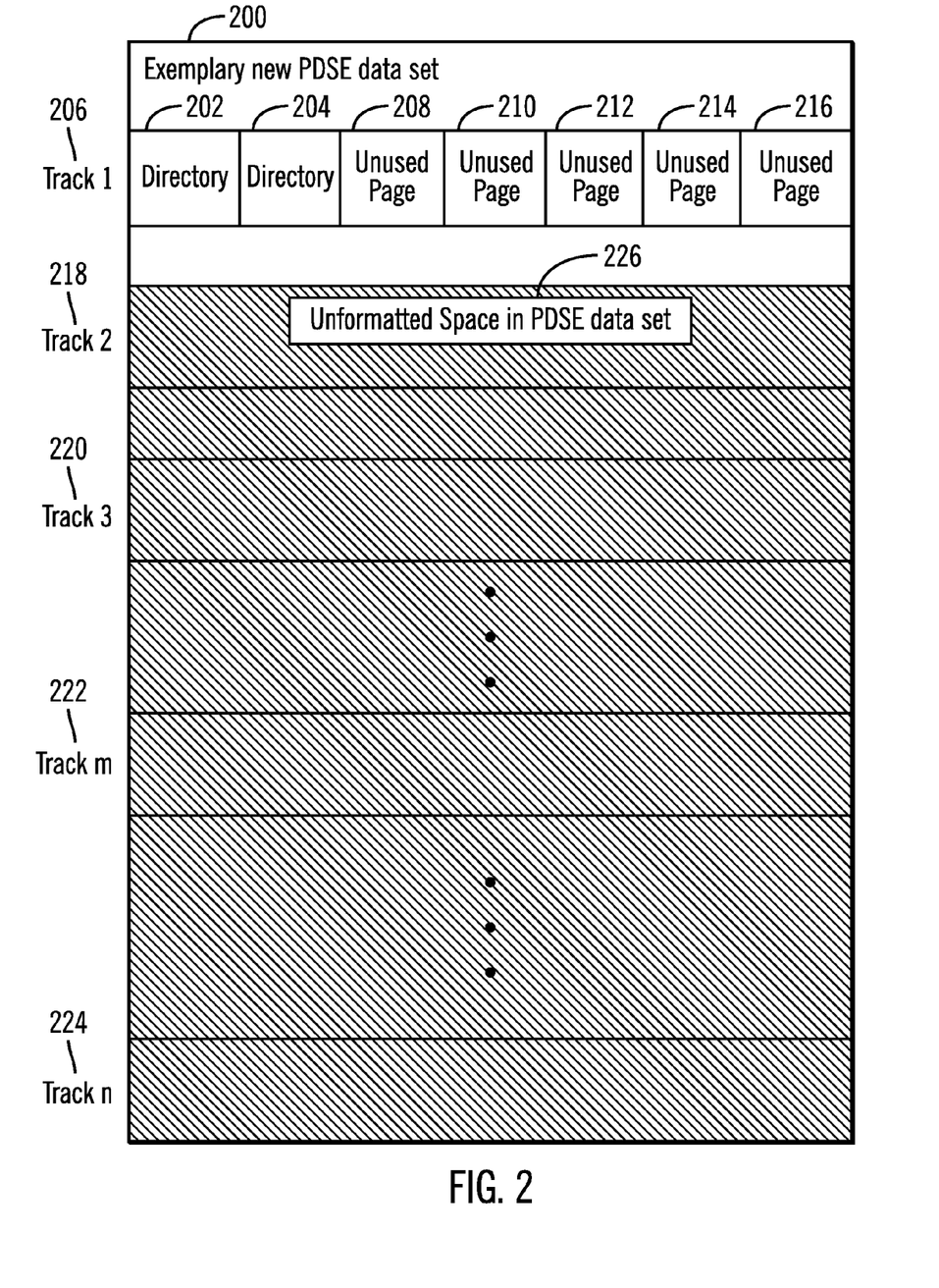
FIG. 2 illustrates a block diagram that shows an exemplary new PDSE data set, in accordance with certain embodiments.

FIG. 2 illustrates a block diagram that shows an exemplary new PDSE data set 200, in accordance with certain embodiments. The exemplary new PDSE data set 200 may have the directory distributed among two contiguous pages 202, 204 on track 1 (reference numeral 206). The other pages 208, 210, 212, 214, 216 on track 1 (reference numeral 206) are initially unused pages in which members that store data may be stored. Tracks 2, 3, . . . , m, . . . , n (shown via reference numerals 218, 220, 222, and 224) are shown as unformatted space 226 in the PDSE data set 200. As the PDSE data set expands new space may be formatted and made available for storing the expanded PDSE data set.

Figure 3:
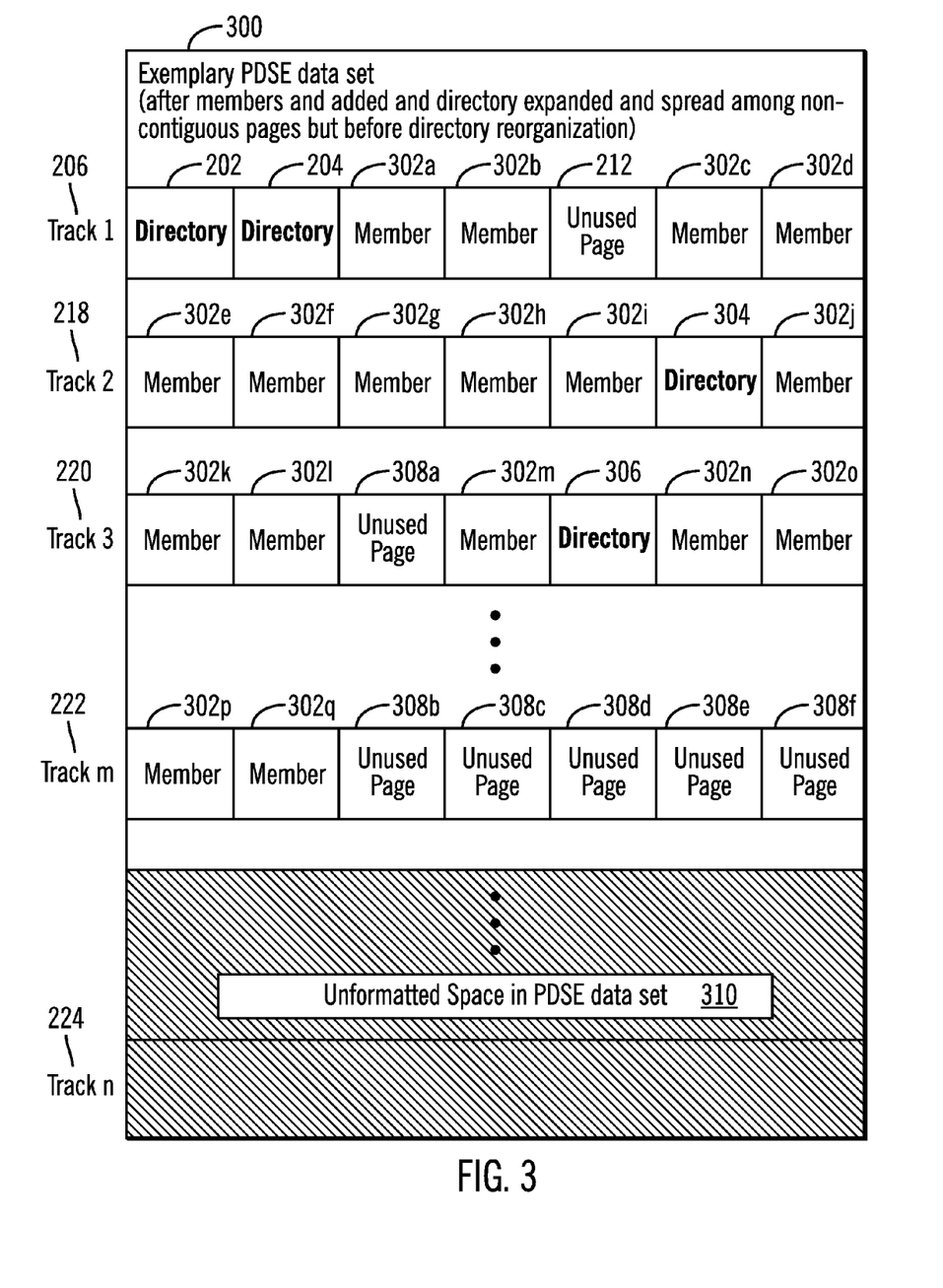
FIG. 3 illustrates a block diagram that shows an exemplary PDSE data set after new members have been added and the directory expanded and spread among non-contiguous pages but before directory reorganization, in accordance with certain embodiments.

FIG. 3 illustrates a block diagram that shows an exemplary PDSE data set 300 after new members have been added to the PDSE data set 200 and the directory expanded and spread among non-contiguous pages but before directory reorganization, in accordance with certain embodiments.

In FIG. 3, the exemplary PDSE data set 300 may be stored in a plurality of tracks 206, 218, 220, 222, 224 wherein some tracks have unformatted space for the PDSE data set 300. With the addition of the members 302a, 302b, 302c, 302d, 302e, 302f, 302g, 302h, 302i, 302j, 302k, 302l, 302m, 302n, 302o, 302p, 302q, the directory that was previously spread only among two pages 202 and 204 (in FIG. 2) has expanded to become spread among four pages 202, 204, 304, 306 that form three non-contiguous areas (the first area comprised of pages 202, 204, the second area comprised of page 304, and the third area comprised of page 306). Non-contiguous pages may comprise pages that are not adjacent to each other. FIG. 3 also shows that unused pages 212, 308a, 308b, 308c, 308d, 308e, 308f, and unformatted space 310 may also be found.

Therefore FIG. 3 shows that as a result of the expansion of the PDSE data set, the directory may become fragmented, i.e., distributed among non-contiguous pages. As the PDSE data set grows over time and new members are added, the directory may become fragmented within the PDSE data set and this can lead to increased overhead and reduced performance.

Certain embodiments detect when the directory of a PDSE data set is becoming fragmented to the point where performance is impacted. The directory reorganization application 114 then dynamically reorganizes the fragmented PDSE directory and places the PDSE directory at the end of the current PDSE.

Figure 4:
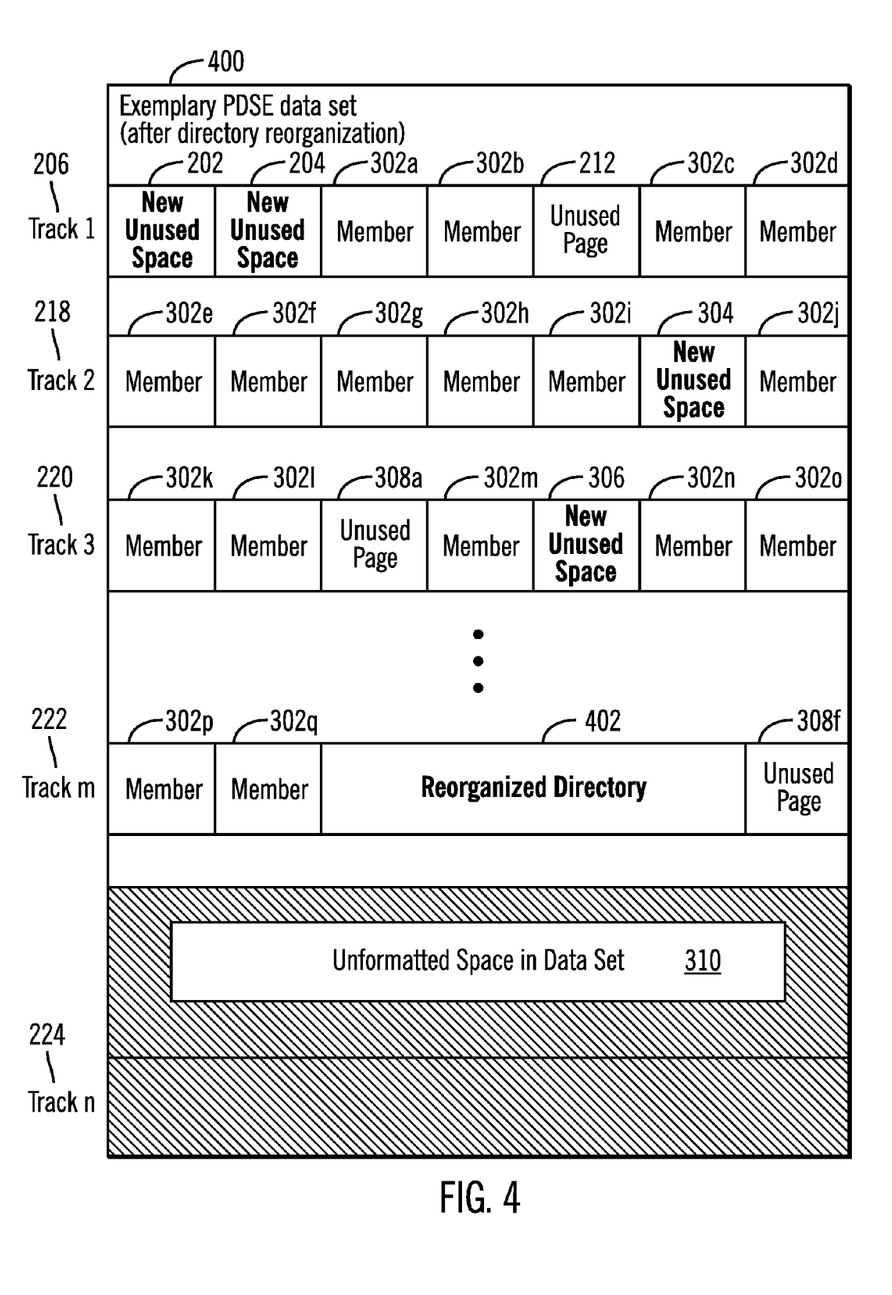
FIG. 4 illustrates block diagram that shows an exemplary PDSE data set after directory reorganization, in accordance with certain embodiments.

FIG. 4 illustrates block diagram that shows an exemplary PDSE data set 400 after directory reorganization of the fragmented directory (previously distributed in pages 202, 204, 304, 306 which now have new unused space) shown in FIG. 3, in accordance with certain embodiments. The reorganized directory 402 is placed at the end of the exemplary PDSE data set 400 as shown in FIG. 4. Thus the fragmented directory is reorganized such that the reorganized directory 402 is stored in contiguous pages at the end of the PDSE data set 400 in the unused pages 308b, 308c, 308d, 308e shown previously in FIG. 3. In FIG. 4 it may be observed that the members 302a, 302b, 302c, 302d, 302e, 302f, 302g, 302h, 302i, 302j, 302k, 302l, 302m, 302n, 302o, 302p, 302q do not move during the reorganization of the fragmented directory and unformatted space 310 may still remain.

Figure 5:
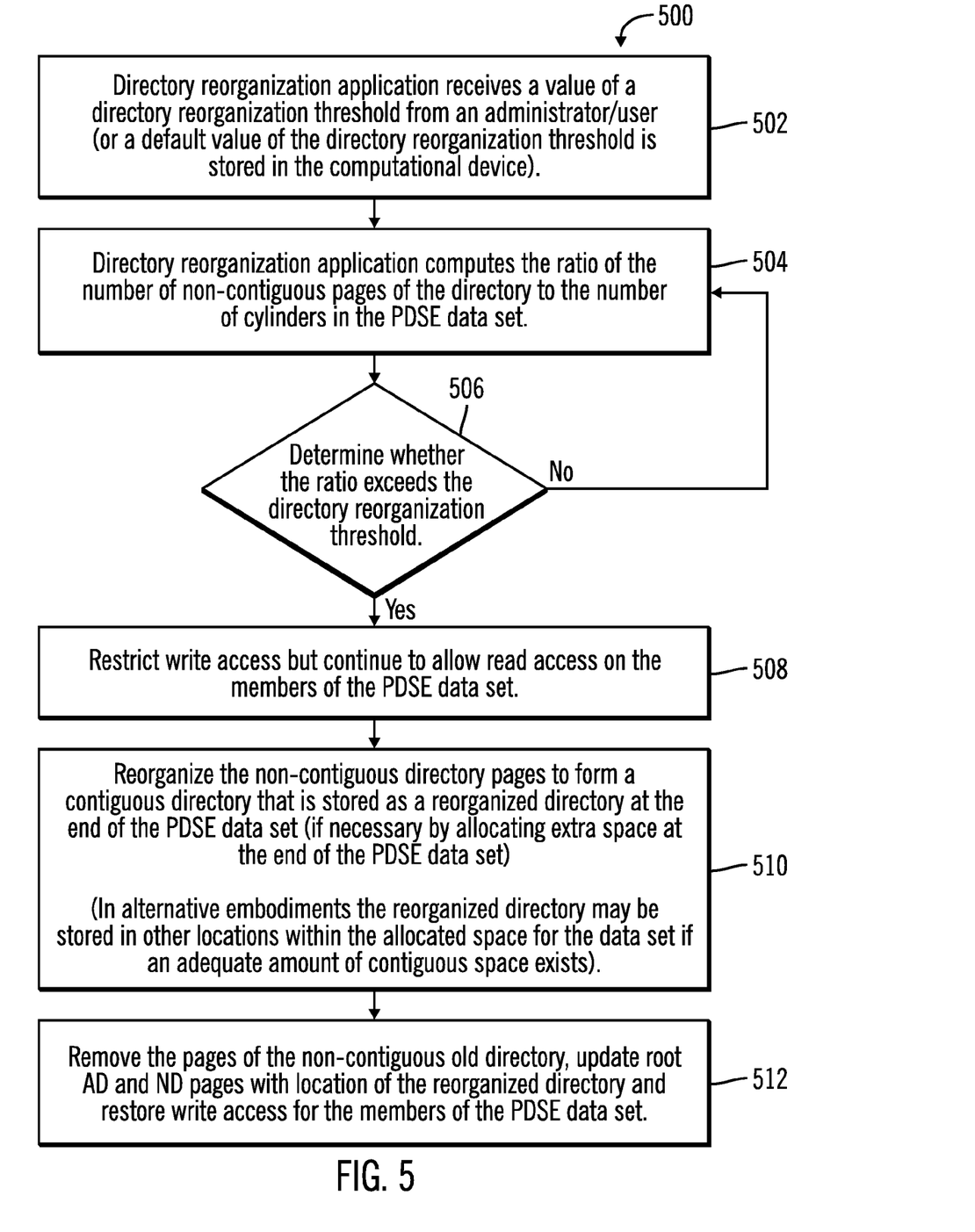
FIG. 5 illustrates a flowchart that shows first operations, in accordance with certain embodiments.

FIG. 5 illustrates a flowchart that shows first operations 500, in accordance with certain embodiments. The first operations 500 may be performed by the directory reorganization application 114 that is implemented within the computational device 102.

Control starts at block 502, in which the directory reorganization application 114 receives a value of a directory reorganization threshold 116 from an administrator or a user. In certain alternative embodiments, the directory reorganization threshold 116 is a default value stored in the computational device 102.

In an exemplary embodiment, the directory reorganization application 114 computes (at block 504) the ratio of the number of non-contiguous pages of the directory to the number of cylinders in the PDSE data set. In an alternative exemplary embodiment the directory reorganization application 114 computes the ratio of the number of non-contiguous pages of the directory to the number of tracks in the PDSE data set.

Control proceeds to block 506 in which the directory reorganization application 114 determines whether the ratio exceeds the directory reorganization threshold 116. If so, then the directory reorganization application 114 restricts (at block 508) write access but continues to allow read access on the members of the PDSE data set. The directory reorganization application 114 reorganizes (at block 510) the non-contiguous directory pages to form a reorganized directory 402 that is stored in contiguous pages at the end of the PDSE data set. If it is necessary, the directory reorganization application 114 allocates extra space at the end of the PDSE data set to store the reorganized directory 402. In alternative embodiments the reorganized directory may be stored in other locations within the allocated space for the PDSE data set, if an adequate amount of contiguous space exists in contiguous unused pages within the PDSE data set to store the reorganized directory. In such embodiments, the reorganized directory may be stored in a location that is not at the end of the PDSE data set.

The directory reorganization application 114 removes (at block 512) the pages of the non-contiguously stored old directory, and updates root attribute directory and name directory pages with the location of the reorganized directory and restores write access for the members of the PDSE data set. The attribute directory is an internal hierarchical structure, implemented as a B-tree (a balanced tree, where balancing minimizes the tree depth and speeds up searching), which contains attribute information about individual members and attributes of the PDSE itself. The name directory pages represent the external members of a PDSE. The name directory is also implemented in a B-tree structure and provides the connection between the individual member names and a file sequence number.

In FIG. 5, if at block 506, the directory reorganization application 114 determines that the ratio does not exceed the directory reorganization threshold then control returns to block 504.

Figure 6:
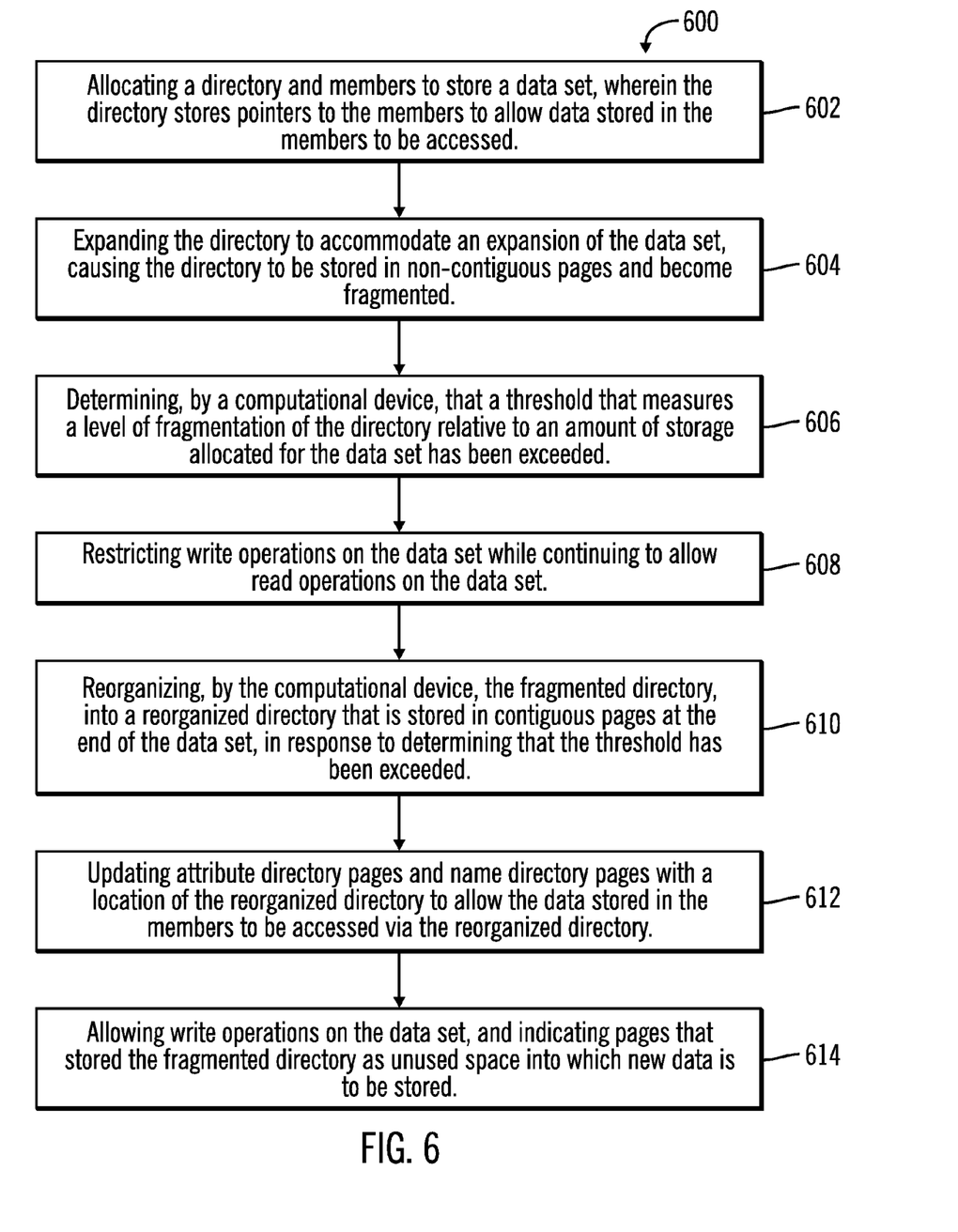
FIG. 6 illustrates a flowchart that shows second operations, in accordance with certain embodiments.

FIG. 6 illustrates a flowchart that shows second operations 600, in accordance with certain embodiments. The second operations 600 may be performed by the directory reorganization application 114 that is implemented within the computational device 102.

Control starts at block 602, in which a directory and members are allocated to store a data set, wherein the directory stores pointers to the members to allow data stored in the members to be accessed. The directory is expanded (at block 604) to accommodate an expansion of the data set, causing the directory to be stored in non-contiguous pages and become fragmented.

Control proceeds to block 606, in which a computational device 102 determines that a threshold 116 that measures a level of fragmentation of the directory relative to an amount of storage allocated for the data set has been exceeded. If so, write operations on the data set are restricted (at block 608) while continuing to allow read operations on the data set. The computational device 102 reorganizes (at block 610) the fragmented directory, into a reorganized directory 402 that is stored in contiguous pages at the end of the data set, in response to determining that the threshold 116 has been exceeded. Attribute directory pages and name directory pages are updated (at block 612) with a location of the reorganized directory 402 to allow the data stored in the members to be accessed via the reorganized directory 402. Write operations are then allowed (at block 614) on the data set, and pages that stored the fragmented directory are indicated as unused space into which new data is to be stored.

Therefore, FIGS. 1-6 illustrates certain embodiments in which a fragmented directory of a PDSE data set is reorganized and stored in a reorganized directory in contiguous pages at the end of the PDSE data set. The members of the PDSE data set remain in pages where the members are originally stored, in response to the reorganizing of the fragmented directory, wherein the pointers to the members remain unchanged in the reorganized directory.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
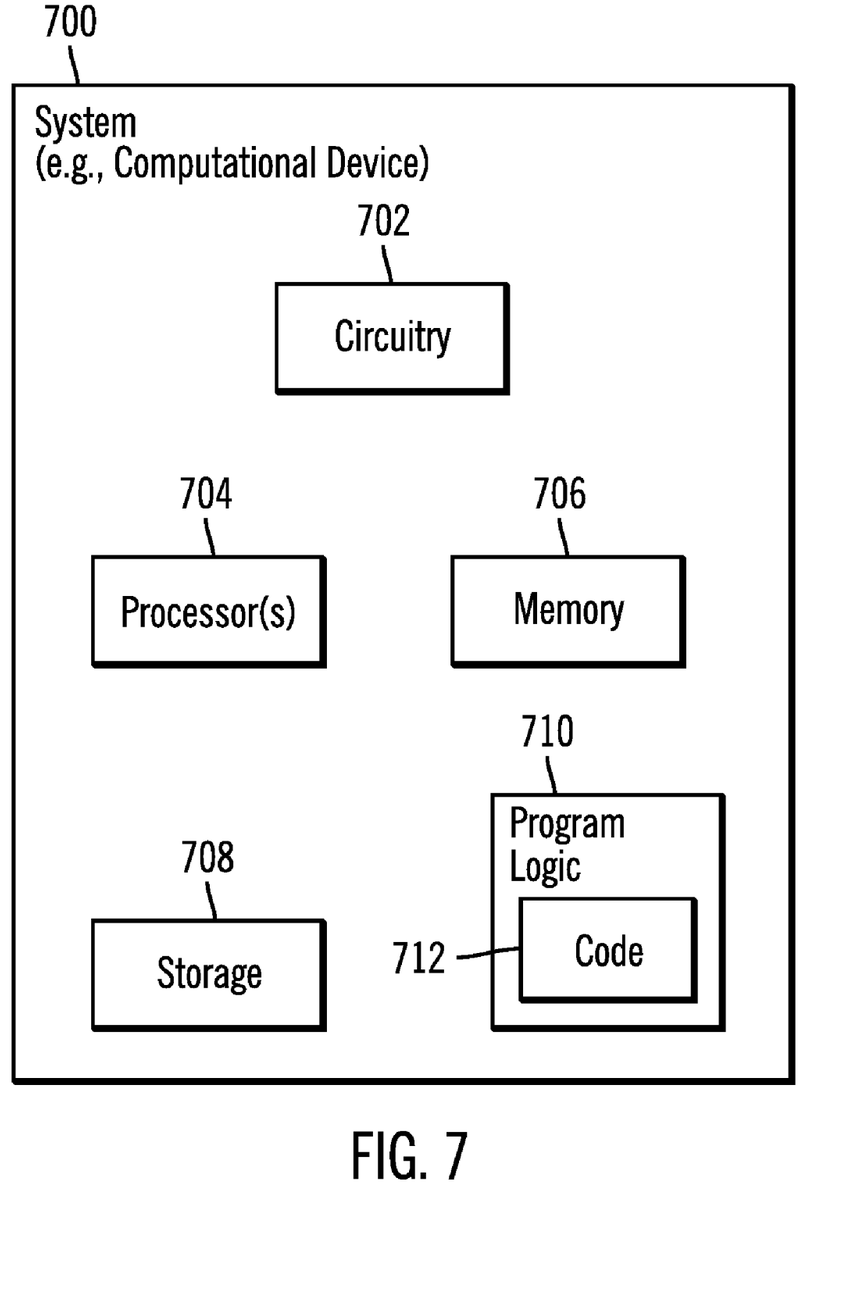
FIG. 7 illustrates a block diagram of a computational system that shows certain elements that may be included in the computational device of FIG. 1, in accordance with certain embodiments.

FIG. 7 illustrates a block diagram that shows certain elements that may be included in the system 700 in accordance with certain embodiments. The system 700 may comprise the computational device 102 and may include a circuitry 702 that may in certain embodiments include at least a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

In certain embodiments, the computational device 102 and the storage devices 104 of FIG. 1 may be cloud component parts included in a cloud computing environment. In the cloud computing environment the systems architecture of the hardware and software components involved in the delivery of cloud computing may involve a plurality of cloud components communicating with each other. For example, in certain embodiments, the computational device 102 of FIG. 1 may provide clients, and other servers and software and/or hardware components in the networked cloud with storage and data processing services. The computational device 102 may provide reliable storage services and access to the storage devices 104 to meet quality of service requirements for customers in the cloud. The computational device 102 may communicate with clients to provide storage and other services for the storage devices 104 through a web interface or other application programming interface.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   allocating a directory and members to store a data set, wherein the directory stores pointers to the members to allow data stored in the members to be accessed;
   expanding the directory to accommodate an expansion of the data set, causing the directory to be stored in non-contiguous pages and become fragmented;
   determining, by a computational device, that a threshold that measures a level of fragmentation of the directory relative to an amount of storage allocated for the data set has been exceeded; and
   reorganizing, by the computational device, the fragmented directory, into a reorganized directory that is stored in contiguous pages at the end of the data set, in response to determining that the threshold has been exceeded.

2. The method of claim 1, wherein the threshold is a ratio of the number of non-contiguous directory pages to the number of cylinders used to the store the data set.

3. The method of claim 1, wherein the threshold is a ratio of the number of non-contiguous directory pages to the number of tracks used to the store the data set.

4. The method of claim 1, further comprising:
   subsequent to determining that the threshold has been exceeded, and prior to reorganizing the fragmented directory, restricting write operations on the data set while continuing to allow read operations on the data set; and
   subsequent to storing the reorganized directory at the end of the data set, allowing write operations on the data set, and indicating pages that previously stored the fragmented directory as unused space into which new data is to be stored.

5. The method of claim 1, wherein the members remain in pages where the members are originally stored, in response to the reorganizing of the fragmented directory, and wherein the pointers to the members remain unchanged in the reorganized directory, the method further comprising:
   updating attribute directory pages and name directory pages with a location of the reorganized directory to allow the data stored in the members to be accessed via the reorganized directory.

6. A system, comprising:
   a memory; and
   a processor coupled to the memory, wherein the processor performs operations, the operations comprising:
   allocating a directory and members to store a data set, wherein the directory stores pointers to the members to allow data stored in the members to be accessed;
   expanding the directory to accommodate an expansion of the data set, causing the directory to be stored in non-contiguous pages and become fragmented;
   determining, by a computational device, that a threshold that measures a level of fragmentation of the directory relative to an amount of storage allocated for the data set has been exceeded; and
   reorganizing, by the computational device, the fragmented directory, into a reorganized directory that is stored in contiguous pages at the end of the data set, in response to determining that the threshold has been exceeded.

7. The system of claim 6, wherein the threshold is a ratio of the number of non-contiguous directory pages to the number of cylinders used to the store the data set.

8. The system of claim 6, wherein the threshold is a ratio of the number of non-contiguous directory pages to the number of tracks used to the store the data set.

9. The system of claim 6, the operations further comprising:
   subsequent to determining that the threshold has been exceeded, and prior to reorganizing the fragmented directory, restricting write operations on the data set while continuing to allow read operations on the data set; and subsequent to storing the reorganized directory at the end of the data set, allowing write operations on the data set, and indicating pages that previously stored the fragmented directory as unused space into which new data is to be stored.

10. The system of claim 6, wherein the members remain in pages where the members are originally stored, in response to the reorganizing of the fragmented directory, and wherein the pointers to the members remain unchanged in the reorganized directory, the operations further comprising:

updating attribute directory pages and name directory pages with a location of the reorganized directory to allow the data stored in the members to be accessed via the reorganized directory.

11. A computer program product, the computer program product comprising:

a computer readable storage medium having computer readable program code embodied therewith, the computer readable program code configured to perform operations, the operations comprising:

allocating a directory and members to store a data set, wherein the directory stores pointers to the members to allow data stored in the members to be accessed;

expanding the directory to accommodate an expansion of the data set, causing the directory to be stored in non-contiguous pages and become fragmented;

determining, by a computational device, that a threshold that measures a level of fragmentation of the directory relative to an amount of storage allocated for the data set has been exceeded; and reorganizing, by the computational device, the fragmented directory, into a reorganized directory that is stored in contiguous pages at the end of the data set, in response to determining that the threshold has been exceeded.

12. The computer program product of claim 11, wherein the threshold is a ratio of the number of non-contiguous directory pages to the number of cylinders used to the store the data set.

13. The computer program product of claim 11, wherein the threshold is a ratio of the number of non-contiguous directory pages to the number of tracks used to the store the data set.

14. The computer program product of claim 11, the operations further comprising:

subsequent to determining that the threshold has been exceeded, and prior to reorganizing the fragmented directory, restricting write operations on the data set while continuing to allow read operations on the data set; and subsequent to storing the reorganized directory at the end of the data set, allowing write operations on the data set, and indicating pages that previously stored the fragmented directory as unused space into which new data is to be stored.

15. The computer program product of claim 11, wherein the members remain in pages where the members are originally stored, in response to the reorganizing of the fragmented directory, and wherein the pointers to the members remain unchanged in the reorganized directory, the operations further comprising:

updating attribute directory pages and name directory pages with a location of the reorganized directory to allow the data stored in the members to be accessed via the reorganized directory.

16. A method for deploying computing infrastructure, comprising integrating computer-readable code into a computational device, wherein the code in combination with the computational device performs operations, the operations comprising:

allocating a directory and members to store a data set, wherein the directory stores pointers to the members to allow data stored in the members to be accessed;

expanding the directory to accommodate an expansion of the data set, causing the directory to be stored in non-contiguous pages and become fragmented;

determining, by a computational device, that a threshold that measures a level of fragmentation of the directory relative to an amount of storage allocated for the data set has been exceeded; and reorganizing, by the computational device, the fragmented directory, into a reorganized directory that is stored in contiguous pages at the end of the data set, in response to determining that the threshold has been exceeded.

17. The method for deploying computing infrastructure of claim 16, wherein the threshold is a ratio of the number of non-contiguous directory pages to the number of cylinders used to the store the data set.

18. The method for deploying computing infrastructure of claim 16, wherein the threshold is a ratio of the number of non-contiguous directory pages to the number of tracks used to the store the data set.

19. The method for deploying computing infrastructure of claim 16, the operations further comprising:

subsequent to determining that the threshold has been exceeded, and prior to reorganizing the fragmented directory, restricting write operations on the data set while continuing to allow read operations on the data set; and subsequent to storing the reorganized directory at the end of the data set, allowing write operations on the data set, and indicating pages that previously stored the fragmented directory as unused space into which new data is to be stored.

20. The method for deploying computing infrastructure of claim 16, wherein the members remain in pages where the members are originally stored, in response to the reorganizing of the fragmented directory, and wherein the pointers to the members remain unchanged in the reorganized directory, the operations further comprising:

updating attribute directory pages and name directory pages with a location of the reorganized directory to allow the data stored in the members to be accessed via the reorganized directory.

* * * * *